Aug. 19, 1952     R. G. SHEIDLER     2,607,870
INDICATING AND CONTROL MECHANISM
FOR ELECTRIC HEATING UNITS
Filed Dec. 11, 1950     2 SHEETS—SHEET 1
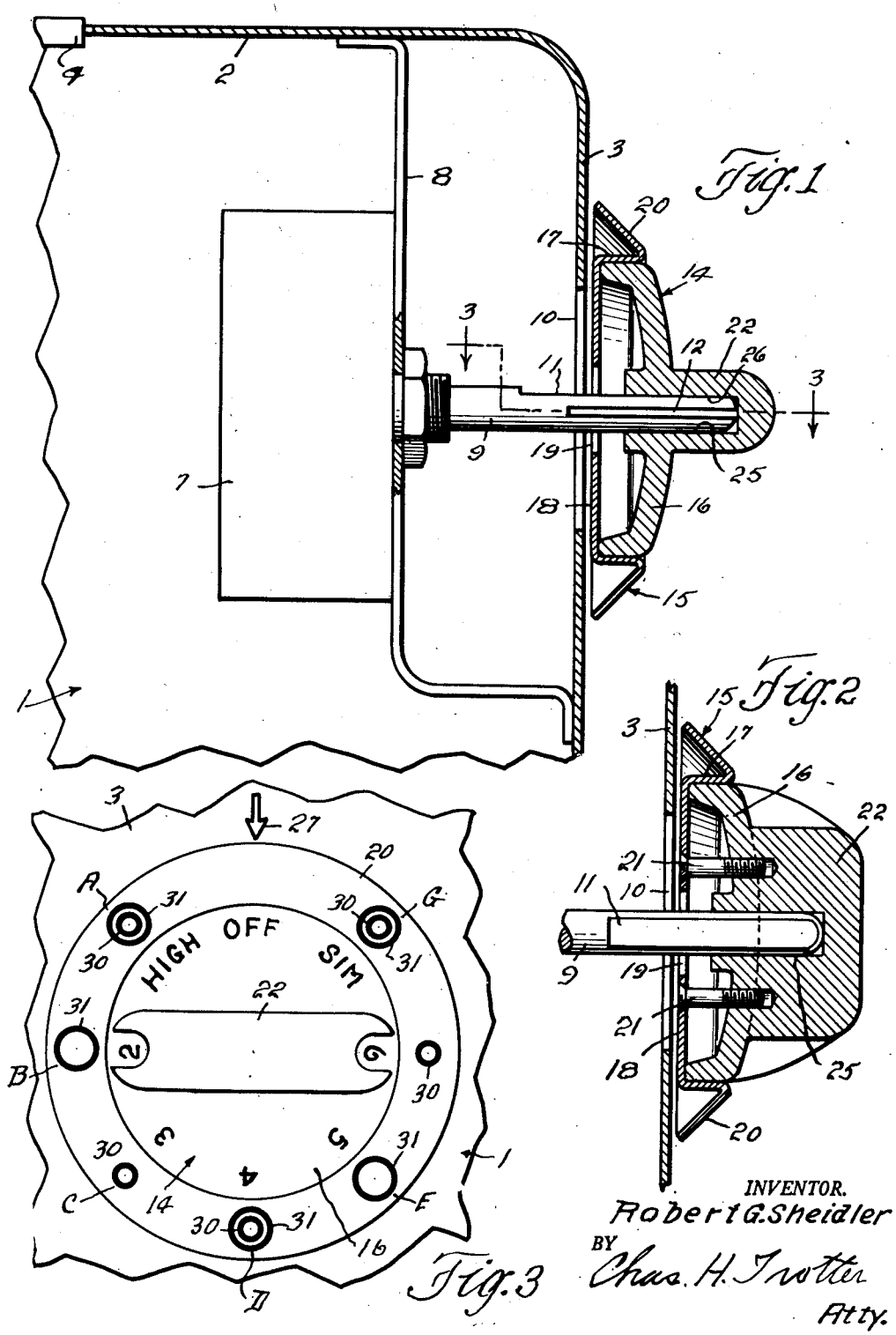
INVENTOR.
Robert G. Sheidler
BY Chas. H. Trotter
Atty.

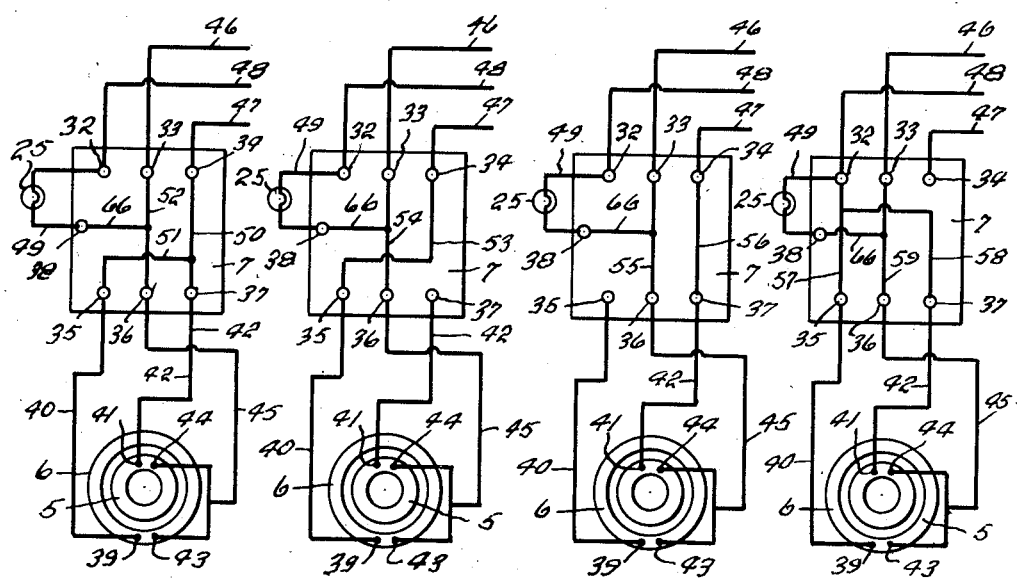
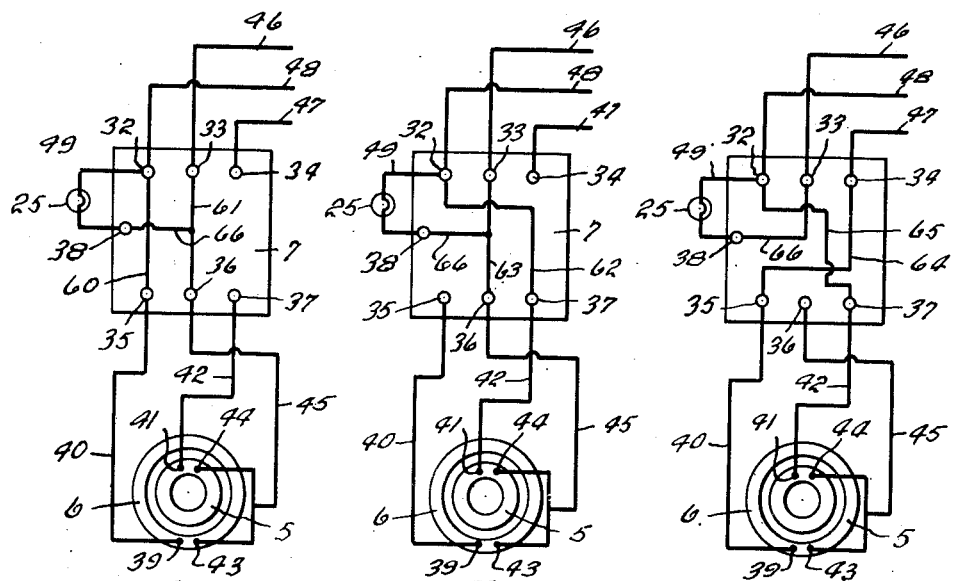

Patented Aug. 19, 1952

2,607,870

UNITED STATES PATENT OFFICE 2,607,870

INDICATING AND CONTROL MECHANISM FOR ELECTRIC HEATING UNITS

Robert G. Sheidler, Mansfield, Ohio, assignor to The Tappan Stove Company, Mansfield, Ohio, a corporation of Ohio Application December 11, 1950, Serial No. 200,175

3 Claims. (Cl. 200—167)

1

This invention relates to an indicating and control mechanism by which the energization of heating units in electric cooking ranges is regulated.

Standard electric heating units for cooking ranges generally comprise a pair of concentrically arranged resistance elements which are adapted to be energized either in conjunction with each other or independently of each other in varying degree in order to generate different amounts of heat. As shown herein the energization of the resistance elements is controlled by a suitable standard switch.

The embodiment of my invention disclosed herein is shown and described in connection with a heating unit having two concentrically arranged standard resistance heating elements which are adapted to be connected by a standard switch to a three-wire, 220 volt transmission system. The switch is arranged to selectively supply current to the resistance elements at either 220 or 110 volts. The two elements may be simultaneously connected to the transmission system or either one alone may be connected thereto. For the purpose of illustration, I have shown a heating unit having an outer heating element, which will produce 700 watts at 220 volts, and an inner heating element which will produce 500 watts at 220 volts. At 110 volts the outer and inner elements will produce 175 and 125 watts, respectively. From this it follows that when the outer and inner elements are simultaneously energized in parallel at 220 volts the unit will produce 1200 watts; and when the elements are simultaneously energized at 110 volts in parallel the unit will produce 300 watts. When the outer element alone is energized the unit will produce 700 watts at 220 volts and 175 watts at 110 volts; and when the inner element alone is energized the unit will produce 500 watts at 220 volts and 125 watts at 110 volts. When the outer and inner elements are simultaneously energized in series at 110 volts the unit will produce 75 watts. From this it will be seen that the unit may be selectively set by the switch to produce either 1200 watts, 700 watts, 500 watts, 300 watts, 175 watts, 125 watts or 75 watts. Generally when cooking the heating unit is substantially covered by the cooking utensil. Consequently one cannot see the heating elements to tell how they are energized. Furthermore, even when the elements are exposed to view, it is not always possible to tell by looking at them just which element is energized and how it is energized, especially at 110 volts.

2

Therefore I provide in my improved mechanism a visual indicator by which one can tell at a glance the exact condition of a heating unit. For the most efficient and economical operation of a heating unit in an electric cooking range it is not only necessary for one to know whether a heating unit is generating high, medium or low etc. heat but it is also very essential that one know which element or elements of a two element heating unit is energized and to what degree. In cooking it generally is customary to first set a heating unit at its highest heat generating capacity to quickly heat food up to the proper cooking temperature and then set the unit for a lower heat which is just sufficient to maintain the food at the proper cooking temperature. For instance in boiling vegetables or other food the heating unit is first set at high heat and as soon as the water commences to boil the unit is set for a lower heat which is just sufficient to keep the water boiling. But the highest heat generating capacity of the unit in many instances may not be the proper setting for efficiently and economically quickly raising food to cooking temperature. Using the two element heating unit described herein, in which the inner and outer elements together generate the highest heat, the outer element alone the second highest heat and the inner element alone the third highest heat, let us assume that one wants to boil food in a utensil which covers only the inner heating element. Under this condition the inner element alone should be energized for initially bringing the water to boiling temperature. If both elements were energized the heat from the outer element would be completely wasted, passing up around the outside of the utensil and heating only the handle thereof. If the outer element alone was energized practically all of the heat would be lost and none applied to the utensil and the contents thereof; whereas with the inner element alone all of the heat generated thereby would be applied to the utensil thereover without any loss. And there are many other occasions during cooking when it is essential for best results to know which element or elements is energized and to what degree, instead of merely knowing that a unit is set to generate high, medium or low etc. heat.

My improved mechanism includes an operating handle which is adapted to be removably secured to the end of the operating stem of a standard switch by which the inner and outer heating elements of a heating unit may be selectively energized as desired. The handle has a cup-shaped base with an annular flange about the open end thereof. On this flange are eight equally spaced stations arranged in an annular row which are adapted to be selectively brought into register with a fixed index mark. One of the stations is the off station and the other seven stations are heating stations, each of which indicates a different setting of the switch when they are in register with the index mark. At each of the heating stations I provide indicia by which one can tell at a glance which heating element of the heating unit is energized and how it is energized. This indicia includes designs which simulate the inner and outer heating elements of the heating unit.

The principal object of the invention is to provide a very simple and ornamental switch operating handle which has incorporated therein indicia by which one can tell at a glance the exact condition of a heating unit in an electric cooking range.

Other and more limited objects of the invention will be apparent from the following specification and the accompanying drawings forming a part thereof in which:

Fig. 1 is an enlarged fragmentary vertical section showing my improved switch operating handle applied to a switch operating stem mounted in an electric cooking range;

Fig. 2 is a front elevation of the handle as shown in Fig. 1;

Fig. 3 is a horizontal section taken on the line 3—3 of Fig. 1; and

Figs. 4 to 10, inclusive, are wiring diagrams, diagrammatically showing the various switching connections by which the heating unit is controlled.

Referring now to the drawings by reference characters, the numeral 1 indicates generally an electric cooking range having the top wall 2 and the front wall 3. An electric heating unit 4 having inner and outer concentric standard resistance heating elements 5 and 6 is suitably supported by the top 2 of the range. The energization of the heating elements 5 and 6 is controlled by a switch 7 by which the elements 5 and 6 are selectively connected to a three-wire, 220 volt transmission system. The switch 7 which is suitably secured to a bracket 8 within the range is a seven-heat switch of standard well known construction. Consequently it is not illustrated in detail herein. The switch 7 has an operating stem 9 which extends out through an aperture 10 in the front wall 3 of the range. The stem 9 has a flattened portion 11 and has its outer end slotted as indicated at 12. An operating handle, generally indicated by the numeral 14, is removably held by friction upon the outer end of the stem 9. By rotating the switch stem 9 by the handle 14 the switch 7 may be selectively set to energize the resistance heating elements 5 and 6 as desired.

The operating handle 14 comprises a cup-shaped base 15 and a cylindrical body 16. The base 15 is preferably formed from a single piece of sheet metal and comprises a cylindrical section 17, one end of which is closed by a flat end wall 18 having a central aperture 19 through which the switch stem 9 extends. An outwardly and rearwardly extending annular flange 20 is secured to the open end of the cylindrical section 17 and surrounds the cylindrical section 17. The cylindrical section 17 and the end wall 18 together form a cup in which the body 16 is seated. Screws 21 hold the base 15 and body 16 rigidly together.

A had grip 22 is formed integral with the body 16 and extends outwardly from the front wall of the body across the mid-section thereof. An axial bore 25 having a flattened portion 26 is provided in the body 16 for the reception of the switch stem 9. The flattened portion 26 of the bore 25 engages the flattened portion 11 of the stem 9 and prevents the handle 14 from rotating independently of the stem 9. On the flange 20 I provide an annular row of equally spaced stations. There are eight of these stations, the "Off" station and seven operating stations, designated A, B, C, D, E, F, and G, respectively, in a counter-clockwise direction from the "Off" station. Each station corresponds to a different setting of the switch 7. By rotating the handle 14 through the hand grip 22 these stations may be selectively brought into register with a fixed index mark 27 on the front wall 3 of the range. The rotating of the handle 14 also rotates the switch stem 9 which sets the switch 7 in accordance with the station brought into register with the index 27.

In order that one may know the setting of the switch 7 and consequently the exact condition of the heating elements 5 and 6 of the heating unit 4, I provide different indicia at each of the stations A to G. At each station the indicia includes a design which simulates the heating element or elements which are energized when that station is brought into register with the index mark 27. The designs consist of a small ring 30 which simulates the inner heating element 5 and a larger ring 31 which simulates the outer heating element 6. Both rings 30 and 31 at a station indicate that both the inner and outer heating elements 5 and 6 are energized; the larger ring 31 only at a station indicates that only the outer heating element 6 is energized, and the small ring 30 only at a station indicates that only the inner ring 5 is energized. The other indicia at the stations A to G, as shown in Fig. 2, is provided to indicate the degree of energization of the elements 5 and 6. If desired the rings 30 and 31 may be colored differently at different stations to indicate different degrees of energization of the heating elements 5 and 6.

As the operating stem 9 is rotated by the handle 14 to set the switch 7 in a selected position, the corresponding station and design on the flange 20 are brought into register with the index 27. The switching arrangement with which station A corresponds is shown in Fig. 4; that to which station B corresponds is shown in Fig. 5; that to which station C corresponds is shown in Fig. 6; that to which station D corresponds is shown in Fig. 7; that to which station E corresponds is shown in Fig. 8; that to which station F corresponds is shown in Fig. 9, and that to which station G corresponds is shown in Fig. 10.

Referring now to Figs. 4 to 10, inclusive, the switch 7 is shown as having seven terminals as indicated at 32, 33, 34, 35, 36, 37 and 38, respectively. The terminal 39 of the outer heating element 6 is connected to the terminal 35 of the switch 7 by the wire 40, and the terminal 41 of the inner heating element 5 is connected to the terminal 37 of the switch by a wire 42. The terminal 43 of the outer heating element 6 and the terminal 44 of the inner heating element 5 are each connected to the terminal 36 of the switch 7 by the wire 45. The three wires of a 220 volt, three-wire transmission system are indicated at 46, 47 and 48. Wires 46 and 47 together will supply current at 220 volts, and either of wires 46 or 47 with neutral wire 48 will supply current at 110 volts. Transmission wire 46 is connected to the terminal 33 of the switch 7 and the wire 47 is connected to the terminal 34 of the switch 7. The neutral wire 48 is connected to the terminal 32 of the switch. The electric signal bulb 24 is connected to the terminals 32 and 38 of the switch 7 by the wire 49. Assuming that the outer heating element 6 will produce 700 watts at 220 volts and 175 watts at 110 volts and that the inner heating element 5 will produce 500 watts at 220 volts and 125 watts at 110 volts, the heating unit 4 will produce 1200 watts when the switch 7 is set as shown in Fig. 4. At this setting the terminal 34 is connected to the terminals 37 and 35 by the lines 50 and 51, and the terminal 33 is connected to the terminal 36 by the line 52. Current will then flow from the wire 46 through line 52 and wire 45 to the terminal 44 of the inner element 5 and to the terminal 43 of the outer element 6. After passing through the inner element 5 the current will flow back to the wire 47 from the terminal 41 through the wire 42 and line 50; and after passing through the outer element 6 the current will flow back to the wire 47 from the terminal 39 through the wire 40 and lines 51 and 50. From this it will be seen that both of the elements 5 and 6 are energized in parallel at 220 volts.

Fig. 5 shows the switch 7 set to energize only the outer element 6 at 220 volts. In this setting the terminal 34 is connected to the terminal 35 by the line 53 and the terminal 33 is connected to the terminal 36 by the line 54. Current will then flow from the wire 46 through the line 54 and wire 45 to the terminal 43 of the outer element 6, and after passing through the element 6 the current will flow from the terminal 39 back to the wire 47 through the wire 40 and line 53.

Fig. 6 shows the switch 7 set to energize only the inner element 5 at 220 volts. In this setting the terminal 33 is connected to the terminal 36 by the line 55, and the terminal 34 is connected to the terminal 37 by the line 56. Current will then flow from the line 46 through the line 55 and wire 45 to the terminal 44 of the inner element 5, and after passing through the element 5 the current will flow from the terminal 41 back to the wire 47 through the wire 42 and line 56.

Fig. 7 shows the switch 7 set to energize both the inner and outer elements 5 and 6 in parallel at 110 volts. In this setting the terminal 32 is connected to the terminals 35 and 37 by the lines 57 and 58, and the terminal 33 is connected to the terminal 36 by the line 59. Current will then flow from the wire 46 through the line 59 and wire 45 to the terminal 43 of the outer element 6 and to the terminal 44 of the inner element 5. After passing through the outer element 6 the current will flow from the terminal 39 back to the neutral wire 48 through the wire 40 and line 57; and after passing through the inner element 6 the current will flow from the terminal 41 back to the neutral wire 48 through the wire 42 and line 58.

Fig. 8 shows the switch 7 set to energize only the outer element 6 at 110 volts. In this setting the terminal 32 is connected to the terminal 35 by the line 60, and the terminal 33 is connected to the terminal 36 by the line 61. Current will then flow from the wire 46 through the line 61 and wire 45 to the terminal 43 of the outer element 6 and after passing through the element 6 the current will flow from the terminal 39 back to the neutral wire 48 through the wire 40 and line 60.

Fig. 9 shows the switch 7 set to energize only the inner element 5 at 110 volts. In this setting the terminal 32 is connected to the terminal 37 by the line 62 and the terminal 33 is connected to the terminal 36 by the line 62. Current will then flow from the wire 46 through the line 63 and wire 45 to the terminal 44 of the inner element 5, and after passing through the element 5 the current will flow from the terminal 41 back to the neutral wire 48 through the wire 42 and the line 62.

Fig. 10 shows the switch 7 set to energize both the inner and outer elements 5 and 6 in series at 110 volts. In this setting the terminal 34 is connected to the terminal 35 by the line 64, and the terminal 32 is connected to the terminal 37 by the line 65. Current will then flow from the wire 47 through the line 64 and wire 40 to the terminal 39 of the outer element 6 and then through the element 6, after which it flows from the terminal 43 of the element 6 through the wire 45 to the terminal 44 of the inner element 5. From the terminal 44 the current flows through the inner element 5 and from the terminals 41 back to the neutral line 48 through the wire 42 and line 65. In all the operative setting of the switch 7, the terminal 33 is connected to the terminal 38 by the line 66 so that an electric light bulb 25 will always be energized whenever the switch is set in an operative position.

From the foregoing it will be apparent that I have provided very simple and efficient means for accomplishing the objects of my invention.

It is to be understood that I am not limited to the specific construction shown and described herein as various modifications may be made therein within the spirit of the invention.

What is claimed is:

1. An operating handle for actuating a rotary switch which controls a cooking range heating unit having inner and outer heating elements, said operating handle comprising a finger grip adapted to be secured to a switch stem, a base rotatable with said finger grip, a plurality of different designs arranged in an annular row on said base, a fixed index with which said designs are adapted to successively register as said handle is rotated, said designs including rings of different diameters to simulate the inner and outer heating elements of a heating unit, and each of said designs indicating which element or elements is energized and to what degree in accordance with the setting of the switch when a selected design is in register with said index.

2. An operating handle for actuating a rotary switch which controls a cooking range heating unit having inner and outer heating elements, said operating handle comprising a cylindrical cup-shaped base, an annular flange secured to the open end of said base, a body section rigidly secured in said cup-shaped base and a hand grip formed integral with said body section, a plurality of different designs arranged in an annular row on said flange, a fixed index with which said designs are adapted to successively register as said handle is rotated, said designs including rings of different diameters to simulate the inner and outer heating elements of a heating unit, and each of said designs indicating which element or elements is energized and to what degree in accordance with the setting of the switch when a selected design is in register with said index.

3. An operating handle for actuating a rotary switch which controls a cooking range heating unit having inner and outer heating elements, said operating handle comprising a cylindrical base, a frusto-conical flange secured to the outer end of said base and extending rearwardly substantially the full length of said cylindrical base, a body section rigidly secured in said cylindrical base and a hand grip formed integral with said body section, a plurality of different designs arranged in an annular row on said flange, a fixed index with which said designs are adapted to successively register as said handle is rotated, said designs including rings of different diameters to simulate the inner and outer heating elements of a heating unit, and each of said designs indicating which element or elements is energized and to what degree in accordance with the setting of the switch when a selected design is in register with said index.

ROBERT G. SHEIDLER.

REFERENCES CITED

The following references are of record in the file of this patent:

UNITED STATES PATENTS

| Number | Name | Date |
|---|---|---|
| 1,818,563 | Lindemann et al. | Aug. 11, 1931 |
| 1,960,179 | Barksdale | May 22, 1934 |
| 2,339,904 | Almquist | Jan. 25, 1944 |
| 2,385,433 | Weber | Sept. 25, 1945 |
| 2,385,434 | Weber | Sept. 25, 1945 |
| 2,404,139 | McCormick | July 16, 1946 |
| 2,409,434 | Jacobs | Oct. 15, 1946 |
| 2,415,858 | Youhouse | Feb. 18, 1947 |
| 2,434,467 | McCormick | Jan. 13, 1948 |
| 2,541,892 | Schulze | Feb. 13, 1951 |